United States Patent [19]

Lee et al.

[11] Patent Number: 4,586,403

[45] Date of Patent: May 6, 1986

[54] ADAPTIVELY CALIBRATED SENSING MECHANISM FOR AN ENGINE DEMAND DEVICE

[75] Inventors: Ronald A. Lee, Brownsburg; William L. McCoy, Mooresville; Ted M. McQuinn, Carmel, all of Ind.

[73] Assignee: General Motors Corporation, Detroit, Mich.

[21] Appl. No.: 568,355

[22] Filed: Jan. 5, 1984

[51] Int. Cl.[4] .................... B60K 41/04; G01M 15/00; G01C 25/00

[52] U.S. Cl. ...................... 74/866; 74/877; 364/571; 364/424.1; 123/480; 73/118

[58] Field of Search ............ 123/480; 364/424.1, 364/571; 74/866, 843, 877; 73/118, 118 A, 117.3, 116

[56] References Cited

U.S. PATENT DOCUMENTS

| | | | |
|---|---|---|---|
| 3,448,640 | 6/1969 | Nelson | 74/866 |
| 3,871,214 | 3/1975 | Masaki et al. | 73/116 |
| 4,061,055 | 12/1977 | Iizuka et al. | 74/866 |
| 4,112,885 | 9/1978 | Iwata et al. | 123/98 |
| 4,118,976 | 10/1978 | Mitsuda et al. | 73/118 |
| 4,184,458 | 1/1980 | Aoki et al. | 123/480 |
| 4,274,306 | 6/1981 | Yokoi et al. | 74/877 |
| 4,359,894 | 11/1982 | Ikeura et al. | 73/118 A |
| 4,366,705 | 1/1983 | Fuji et al. | 73/118 A |
| 4,389,910 | 6/1983 | Lockhart | 74/843 |
| 4,413,601 | 11/1983 | Matsuoka et al. | 123/480 |
| 4,481,596 | 11/1984 | Townzen | 364/571 |
| 4,492,202 | 1/1985 | Muramatsu et al. | 123/480 |
| 4,495,454 | 1/1985 | Collonia | 364/431.05 |
| 4,515,009 | 5/1985 | Hasegawa et al. | 73/118 |

FOREIGN PATENT DOCUMENTS 1439675 6/1976 United Kingdom ............ 364/424.1

OTHER PUBLICATIONS

"Electronic Controls for Bus, Truck, and Off-Highway Vehicle Transmissions", K. B. Harmon and K. D. Struthers, SAE Paper 820909, Oct. 4, 1982.
Sales brochure for Detroit Diesel Allison Electronic Transmission Control; Aug. 1983.

Primary Examiner—Lawrence J. Staab
Assistant Examiner—Michael D. Bednarek
Attorney, Agent, or Firm—T. G. Jagodzinski

[57] ABSTRACT

A position indication derived from the output signal of an engine demand device sensor is compensated for errors which tend to expand or contract the range of such output signal. The signal is compared to previously stored upper and lower reference values nominally corresponding to the limit positions of the demand device, and the position indication is derived in accordance with such comparison. The compensation is achieved by altering the previously stored upper and lower reference values at the initiation of each period of vehicle operation, in a sense to contract the range of output signals defined thereby, and by replacing the upper or lower reference values with the sensor output signal value during the ensuing period of vehicle operation if the sensor output signal value is greater or less than the upper or lower reference values, respectively.

6 Claims, 9 Drawing Figures

ADAPTIVELY CALIBRATED SENSING MECHANISM FOR AN ENGINE DEMAND DEVICE

This invention relates to a sensing mechanism for indicating the position of a motor vehicle power demand device and more particularly to a system for compensating the position indication for sensing mechanism errors.

Motor vehicle drive train electronic controllers often require an electrical input signal indicative of the position of the accelerator pedal or other operator manipulated engine power demand device. Typically, such input signal is obtained directly from a sensor, such as a potentiometer, mechanically connected to the demand device. The input signal varies in magnitude as a function of the position of the demand device and the electronic controller compares the input signal value or the digital equivalent thereof to previously stored upper and lower reference values representative of sensor output signal values nominally corresponding to the upper and lower limit positions of the demand device. If the demand device is an accelerator pedal, for example, the upper reference value may be indicative of the fully released pedal position and the lower reference value may be indicative of the fully depressed pedal position. In the above application, the actual value of the sensor output signal relative to the upper and lower reference values provides an indication of the percentage of the accelerator pedal depression, and hence, the percentage of the available engine power or speed requested by the operator of the vehicle. Such indication is then used to determine related driveline control parameters, such as transmission shifting points.

In systems of the above type, we have found that the input signal provided by the sensor is subject to errors, including sensor misadjustment, drift, wear, etc., and that such errors may adversely affect the resulting drive train control. Whenever errors alter the normal relationship between the demand device position and the sensor output signal, the resulting driveline performance level fails to correspond to the expectations of the operator. In some instances, the operator may be unable to achieve the performance level desired.

Accordingly, it is an object of this invention to provide an improved system including a sensor for providing an output signal in accordance with the position of a motor vehicle demand device and an electronic controller for providing an indication of such position, wherein the electronic controller compensates the position indication for errors which affect the sensor output signal value.

It is a further object of this invention to provide an improved system of the above type wherein the electronic controller compares the sensor output signal value with upper and lower previously stored reference values corresponding to the limit positions of the demand device and wherein the reference values are modified during vehicle operation as required to compensate the position indication for sources of error which affect the sensor output signal value.

It is yet a further object of this invention to provide an improved system of the above type wherein the position indication is compensated for errors which tend to expand the range of sensor output signal values outside the range defined by the previously stored upper and lower reference values and which tend to contract the range of sensor output signal values within the range defined by the previously stored upper and lower reference values.

The above objects are carried forward by comparing the sensor output signal value to the previously stored upper and lower reference values during vehicle operation and by replacing the upper or lower reference values with the sensor output signal value if the sensor output signal value is respectively above or below the corresponding upper or lower reference values. In addition, the previously stored upper and lower reference values are altered at the initiation of each period of engine operation by a predetermined amount, and in a sense to contract the range of sensor output signal values from the range defined by the previously stored upper and lower reference values. If sensor mechanism related errors alter the relationship between the demand device position and the sensor output signal, and cause the output signal to fall outside the range of values defined by the previously stored upper and lower reference values, the reference values are adaptively modified to expand the range of values they define and thereby compensate for the error. The contraction of the range at the initiation of vehicle operation permits the control described above to compensate the position indication for errors which contract the sensor output signal range.

Figure 1:
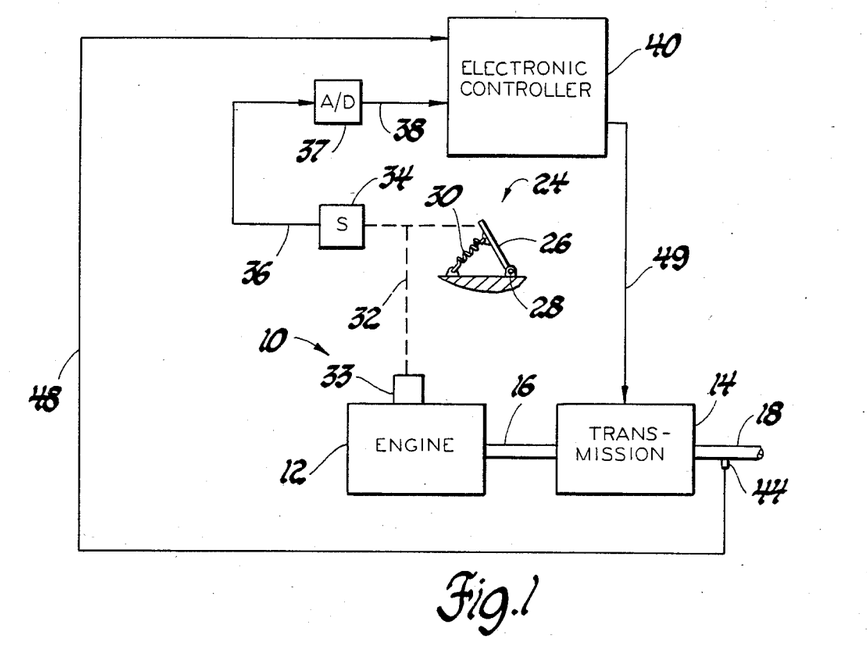
FIG. 1 schematically depicts a motor vehicle drive train, an operator manipulated accelerator pedal and position sensor therefor, and a microprocessor-based electronic controller responsive to the sensor output signal for controlling the drive train operation.

Referring now more particularly to FIG. 1, reference numeral 10 generally designates a motor vehicle drive train comprising an engine 12 and a transmission 14. The engine output shaft 16 is connected to the input of transmission 14 and the transmission output shaft 18 is drivingly connected to one or more of the vehicle wheels to provide propulsion.

A conventional accelerator pedal mechanism is generally designated by the reference numeral 24 and comprises a pedal 26 pivotable about point 28, and a spring 30 for resiliently biasing pedal 26, to the fully released position as shown in FIG. 1. The accelerator pedal mechanism 24 represents an engine demand device and the operator of the vehicle manipulates the position of the pedal 26 to indicate the desired engine output. The pedal 26 is mechanically connected as indicated by the dashed lines 32 to an engine power control device 33 and to a position sensor 34. The power control device 33 may be a conventional mechanism such as a throttle plate (if engine 12 is a gasoline engine) or a fuel rack (if engine 12 is a diesel engine) and operates in response to the position of pedal 26 to regulate the power output of engine 12. The position sensor 34 may also be a conventional device such as a linear or rotary potentiometer, the wiper of which is moved by the accelerator pedal 26. As such, the sensor 34 provides an analog electrical output signal on line 36 that varies in accordance with the pedal position.

The sensor output signal on line 36, is connected as an input to analog-to-digital converter (A/D) 37 which provides an 8-bit digital output on line 38 that varies in accordance with the analog voltage on line 36. Line 38, in turn, is connected as an input to electronic controller 40. The speed transducer 44 is located in a manner to sense the rotational velocity of transmission output shaft 18 and provides an input to electronic controller 40 in accordance therewith via line 48. In response to the accelerator pedal position signal on line 38 and the speed signal on line 48, electronic controller 40 develops an electrical control signal on line 49 for regulating the operation of transmission 14. To this end, transmission 14 includes suitable control devices (not shown) electrically controllable to regulate the operation of the transmission control elements. Representative control devices and elements are schematically depicted in the U.S. Pat. No. 3,448,640 to Nelson issued June 10, 1969, which patent is assigned to the assignee of the present invention.

As set forth above, the present invention relates to the method by which the electronic controller 40 compensates the pedal position signal on line 38 for sensor errors such as drift, misalignment and wear. The compensated position indication is then used in conjunction with the speed signal on line 48 to develop transmission control signals. Suitable control algorithms for developing such control signals are disclosed in the above-referenced U.S. Pat. No. 3,448,640. To implement the above control functions, the electronic controller 40 preferably comprises a microprocessor and associated support devices. A number of commercially available devices are adequate to perform the control functions of this invention, such as the MC6800 series components manufactured by Motorola Semiconductor Products, Inc., Austin, Tex. The electronic controller 40 reads the values of various input signals, performs various logical and mathematical operations thereon in accordance with a stored computer program for developing a transmission control signal and outputs such control signal to transmission 14 via line 49. Flow diagrams representative of suitable program instructions for performing the control functions of this invention are given in FIGS. 5-9. The further control functions performed by electronic controller 40, such as the development of transmission control signals, are not pertinent to the present invention, and therefore are not specifically addressed herein.

Figure 2:
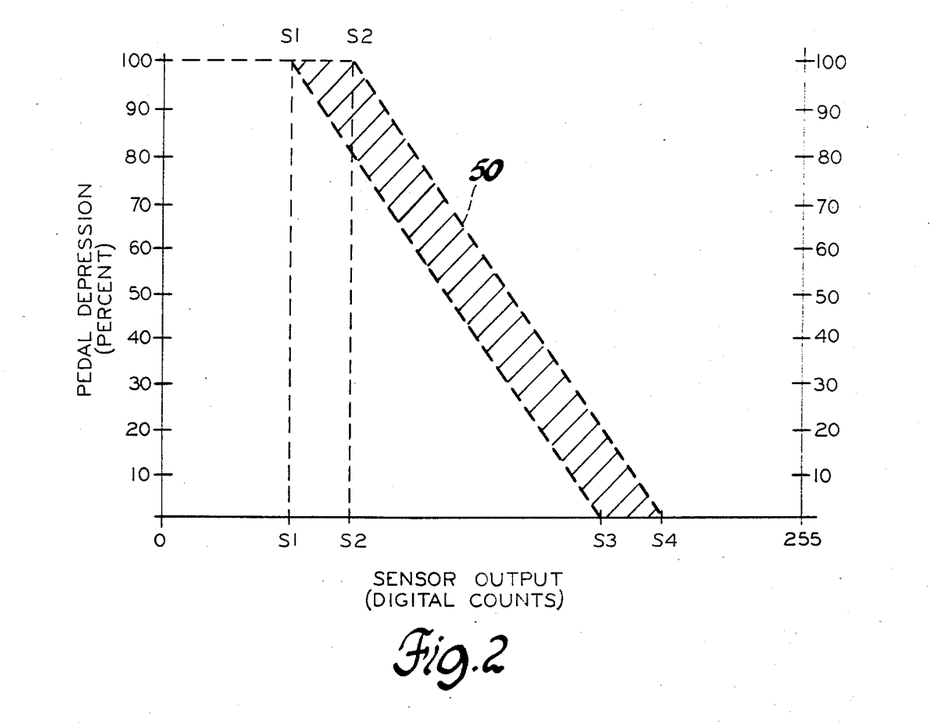
FIGS. 2 through 4 are graphs depicting the sensor output signal as a function of accelerator pedal depression.

FIG. 2 depicts the relationship between the position of accelerator pedal 26 in percent depression, and the output of analog-to-digital converter 37 in digital counts. The linkage 32 between accelerator pedal 26 and sensor 34 is factory calibrated such that the trace which defines the relationship between the pedal position and the sensor output signal value lies within the shaded envelope designated in FIG. 2 by the reference numeral 50. Thus, the digital sensor output signal on line 38 must fall between the specification values S1 and S2 when the pedal 26 is fully depressed, and between the specification values S3 and S4 when the pedal 26 is fully released. The factory specification values S1-S4 are chosen not only to produce sensor output values in the middle of the analog-to-digital converter output range, but also to ensure that the difference between the fully depressed digital output signal value and the fully released digital output signal value is at least 100 counts, a value chosen to minimize the analog-to-digital conversion error to 1% pedal movement or less. In other words, S3 minus S2 is greater than or equal to 100 counts.

In a conventional system, it is assumed that the factory calibration of the sensor 34 and linkage 32, as defined above, is maintained over the life of the vehicle. The factory specification values are used to define upper and lower reference values which correspond to the sensor output values which occur when the accelerator pedal is fully released and fully depressed, respectively. Such reference values, in turn, define the slope value M of a trace which depicts the relationship between pedal position and the sensor output value, and the electronic controller 40 computes an indication of pedal depression as a function of such slope value M and the sensor output value. The result of the computation is then used by the electronic controller 40 to develop a control signal for transmission 14.

It will be understood, of course, that although the sensor output signal varies in inverse relation to the percentage of pedal depression in the illustrated embodiment, the invention disclosed herein is equally applicable to a system wherein the sensor output signal varies in direct relation to the percentage of pedal depression. In such case, the upper reference value would correspond to the fully depressed pedal position and the lower reference value would correspond to the fully released pedal position.

The motivation for this invention stems from the recognition that the factory calibration described above is not necessarily maintained over the life of the vehicle. Rather, one may expect changes of such calibration due to a number of factors including wear, ambient operating conditions, and misadjustment of the linkage. If the factory calibration is altered due to errors of the type referred to above, the pedal position indication will be incorrect and the transmission control may be adversely affected.

Figure 3:
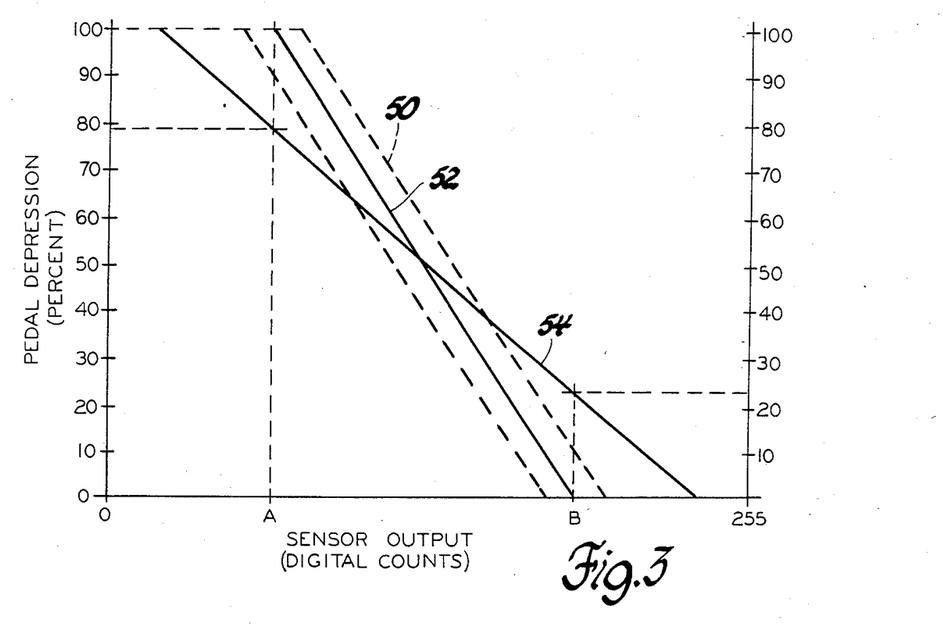

Pedal depression computations of the type referred to above are graphically depicted in FIG. 3. The traces 52 and 54 depict the relationship between accelerator pedal depression and sensor output signal for different vehicles. The trace 52 depicts the relationship for a properly calibrated unit and the trace 54 depicts the relationship for a unit which has been subject to misadjustment, wear or other like sources or error. Accordingly, the trace 52 lies within the envelope 50 and the trace 54 lies at least partially outside the envelope 50. The letters A and B represent specified sensor output signal valves. In the properly calibrated unit, complete depression of pedal 26 produces a sensor output signal value of A counts yielding a position indication of 100%—the correct value. Likewise, in the properly calibrated unit, complete release of the pedal 26 produces a sensor output signal value of B counts, yielding a position indication of 0%—again, the correct value. In the misadjusted unit, however, the electronic controller 40 computes a position indication of 100% when the pedal is depressed only 78%. Similarly, the electronic controller 40 computes a position indication of 0% when the pedal 26 is depressed 23%. In the misadjusted unit, the position indication does not correspond to the actual pedal position and the transmission control signal derived therefrom may fail to produce the driveline performance which corresponds to the expectations of the operator.

The performance deficiencies discussed above are avoided according to this invention by compensating the pedal position indication for sensing mechanism errors which alter the relationship between the position of the demand device (accelerator pedal 26) and the sensor output signal value. The upper and lower reference values which represent sensor output signal values corresponding to the limit positions of the demand device are updated during vehicle operation so that the demand device position versus sensor output signal relationship defined thereby accurately reflects the actual calibration of the sensing mechanism. In turn, the position indication derived by electronic controller 40 will accurately represent the position of the demand device. Each time the sensor output signal value falls below the stored lower reference value or rises above the stored upper reference value, the electronic controller 40 replaces the respective stored reference value with the sensor output signal value. As a result, the stored pedal position versus sensor output signal relationship is updated to compensate the position indication derived therefrom for errors which tend to expand the range of sensor output signal values outside the range of the values defined by the previously stored upper and lower reference values. This approach, however, will not compensate for errors which act in the opposite direction—that is, errors which tend to contract the range of sensor output signal values within the range defined by the previously stored upper and lower reference values. Such errors are undetectable since the resulting sensor output signal values fall between the stored reference values and would therefore be indistinguishable from normally occurring sensor output values associated with partial depression of accelerator pedal 26. According to this invention, however, the stored upper and lower reference values are altered at the initiation of each period of vehicle operation in a direction to reduce or contract the range of values defined thereby. In the ensuring period of vehicle operation, the stored upper and lower reference values are modified as required by the approach described above until the pedal position versus sensor output signal relationship defined thereby accurately represents the actual calibration of the system. In this way, the errors which tend to contract the range of sensor output signal values are also compensated for.

Figure 4:
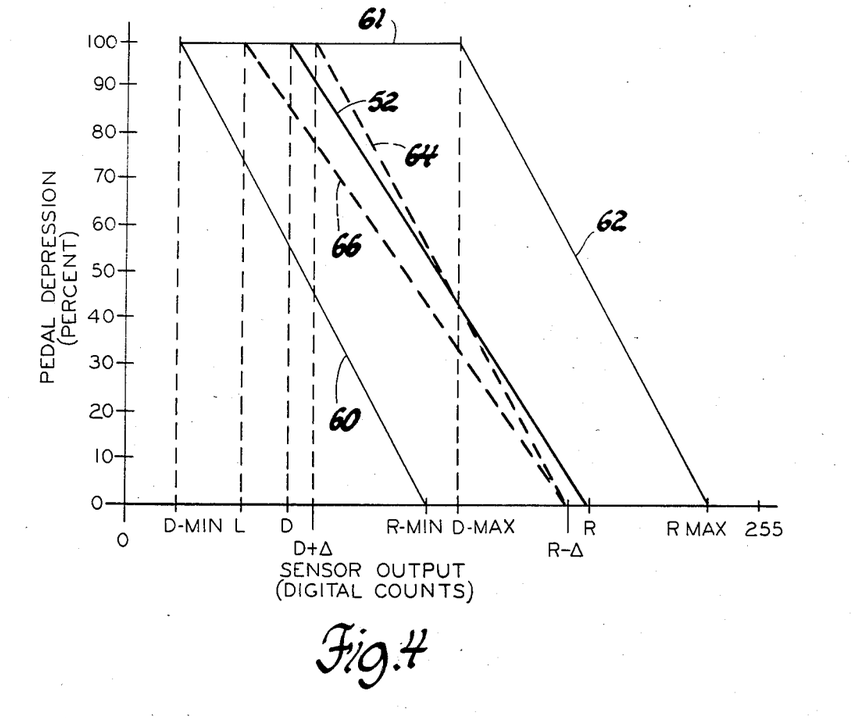

An example of the above described control is graphically depicted in FIG. 4. For the purpose of such example, it is assumed that the relationship between the pedal depression and the sensor output signal is given by the line 52. Thus, the lower reference value which represents the fully depressed pedal position is given by the letter D and the upper reference value which represents the fully released position is given by the letter R. At the initiation of each period of vehicle operation, the upper and lower reference values R and D are altered as described above in a direction to reduce the difference therebetween. The amount by which the reference values are altered is predetermined and is designated in FIG. 4 by the Greek letter delta ($\Delta$). Thus, the lower reference value D is replaced by the value D+$\Delta$ and the upper reference value R is replaced by the value R−$\Delta$. Due to such alteration, the pedal position versus sensor output signal value relationship is given by the trace 64. As such, position indications at the initiation of vehicle operation are determined in accordance with the relationship given by trace 64. If, during the ensuing period of vehicle operation, the actual sensor output signal value exceeds the newly stored upper reference value (R−$\Delta$), or falls below the newly stored lower reference value (D+$\Delta$), the respective reference value is replaced by the higher or lower sensor output signal value. Thus, if the sensor output signal value falls to the level indicated by the letter L in FIG. 4, it is assumed that the relationship stored in electronic controller 40 and defined by the stored upper and lower reference values is no longer valid. To compensate for the perceived error, the electronic controller 40 replaces the lower reference value of D+$\Delta$ with the value L. The new relationship expands the range of sensor output signal valves, thereby compensating for the perceived error which caused the sensor output signal to fall outside the previously defined range of output signal values. Such new relationship is given in FIG. 4 by the trace 66.

The electronic controller 40 establishes ranges of permissible sensor output signal values for both the upper and the lower reference values. The range for the upper reference value extends from D-MIN to D-MAX, and the range for the lower reference value extends from R-MIN to R-MAX. Such ranges define an envelope of permissible values bonded by the horizontal axis and the lines 60–62. Thus, the traces 52, 64 and 66 referred to above all fall within the envelope of values and therefore are considered reasonable. However, if the sensor output signal value falls outside the envelope values, the electronic controller 40 assumes that a failure has occurred and that the sensor output signal is no longer a reliable indication of the position of accelerator pedal 26. The minimum sensor output signal value D-MIN is greater than zero so that an open circuit or other malfunction which causes the output of analog-to-digital converter 37 to assume a value of zero, will not be interpreted as a reliable pedal position indication. Similarly, the highest allowable sensor output signal value R-MAX is lower than the highest available digital count (255) so that a malfunction which causes the sensor output signal to assume its maximum value will not be interpreted as a reliable indication of the accelerator pedal position.

According to another aspect of this invention, the controller 40 establishes a minimum difference between the upper and lower reference values of 100 digital counts. As noted above, such minimum difference serves to minimize the analog-to-digital conversion error to 1% throttle movement or less. If the alteration of the previously stored reference values causes such difference to be less than 100 counts, the slope defined by the upper and lower reference values is replaced with a reference slope M—REF for the purpose of computing the position indication.

Figures 5, 6:
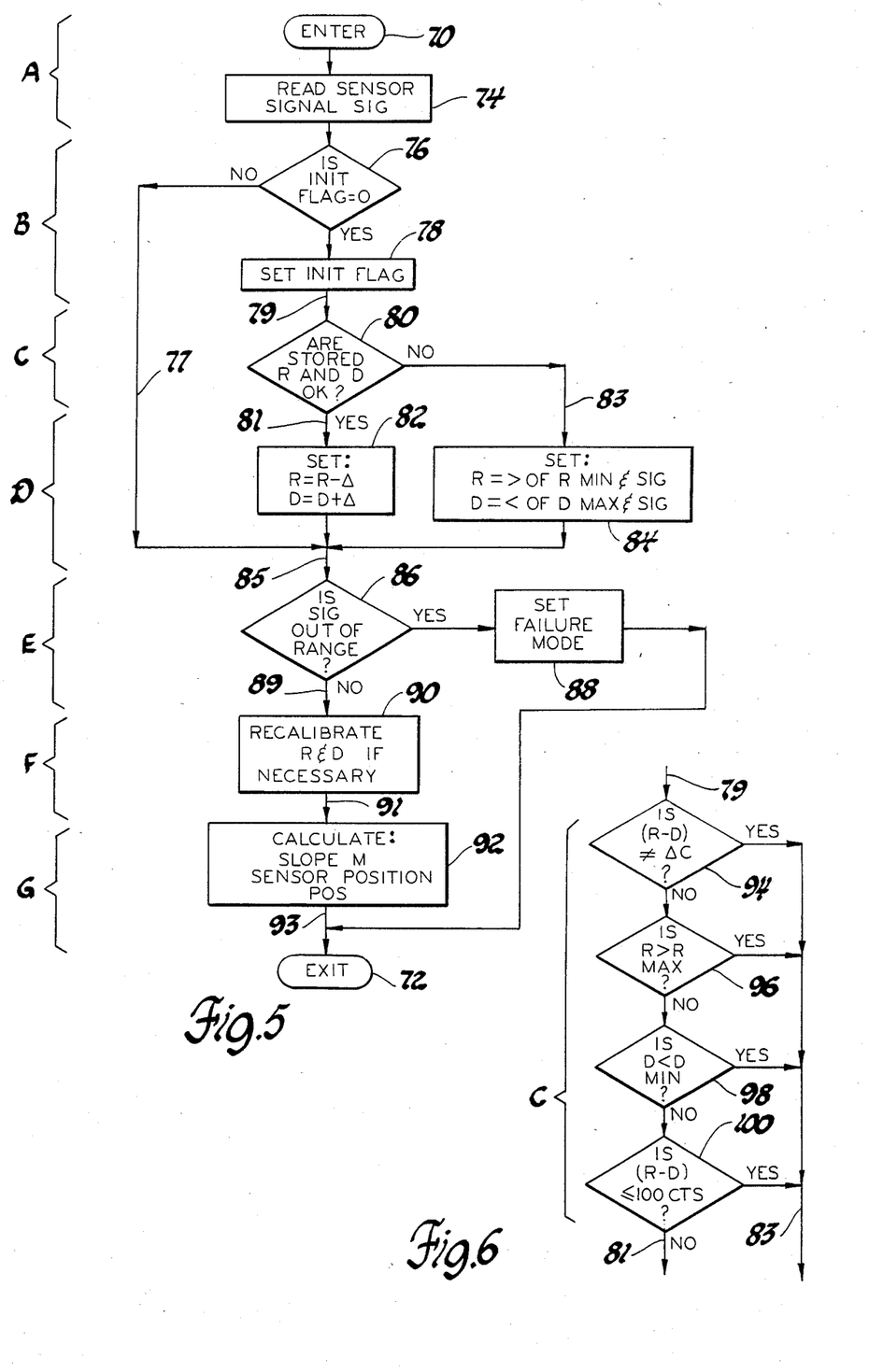
FIGS. 5 through 9 show flow diagrams representative of program instructions to be executed by the microprocessor-based electronic controller shown in FIG. 1 for implementing the control functions of this invention.

The electronic controller 40 performs the control functions described above with a microprocessor-based system by executing program instructions represented by the flow diagram given in FIGS. 5–9. FIG. 5 is an overall flow diagram and FIGS. 6–9 expand on certain of the flow diagram blocks depicted in FIG. 5.

The flow diagram in FIG. 5 is functionally divided into seven portions, the portions being designated by the letters A–G. Since the flow diagram represents program instructions which are presumably part of a much larger computer program, the flow diagrams begins with an ENTER block 70 and ends with an EXIT block 72. The flow diagram portion A comprises an instruction block 74 for reading the sensor output signal (SIG) on line 38. The portion B comprises instruction blocks 76 and 78 and serves to detect the initiation of vehicle operation using a memory location designated as the INIT flag. The portion C comprises instruction block 80 and serves to determine if the stored upper and lower reference values (R and D) are reasonable. The portion D comprises instruction blocks 82 and 84 and serves to define the upper and lower reference values at the initiation of vehicle operation. The portion E comprises instruction blocks 86 and 88 and serves to determine if the sensor output signal (SIG) is out of range, and if so, to institute a failure mode of operation. The portion F comprises the instruction block 90 and serves to update the stored upper and lower reference values (R and D) if necessary. The portion G comprises the instruction block 92 and serves to compute the position indication (POS) as a function of the sensor output signal value (SIG) and the slope M defined by the upper and lower reference values (R and D).

The execution of the flow diagram depicted in FIG. 5 will now be described. At the initiation of each period of vehicle operation, the INIT flag as well as other memory locations within electronic controller 40 are reset to zero. Thus, the first time in each period of vehicle operation that the flow diagram of FIG. 5 is executed, instruction block 76 is answered in the affirmative and instruction blocks 78–84 are executed. Since instruction block 78 operates to set the INIT flag, instruction block 76 is answered in the negative when the flow diagram is subsequently executed in such period of vehicle operation and the execution of instruction blocks 78–84 is skipped as indicated by flow diagram line 77. The instruction blocks 80–84 function as an initialization routine for determining if the previously stored upper and lower reference values (R and D) are reasonable and for determining their initial value for the period of vehicle operation. If the stored values are reasonable, instruction block 82 is executed to alter the upper and lower reference values by the amount $\Delta$, as explained in reference to FIG. 4 above. If the stored values are not reasonable, they are initialized as set forth in instruction block 84. In such case, the upper reference value (R) is set equal to the greater of the sensor output signal value (SIG) and the value R-MIN, and the lower reference value (D) is set equal to the lesser of the sensor output signal (SIG) and the value D-MAX.

If the sensor output signal (SIG) is greater than R-MAX or less than D-MIN, it is out of range and instruction block 86 is answered in the affirmative. In such case, instruction block 88 is executed to set a failure mode of operation wherein the throttle position indication is set equal to a fixed and predetermined value. If, on the other hand, the sensor output signal (SIG) is in range, instruction block 90 is executed to update the stored upper and lower reference values (R and D) if necessary. Then, instruction block 92 is executed to calculate the position indication POS as a function of the sensor value (SIG) and the slope M defined by the upper and lower reference values. The flow diagram portions C, D, F and G are expanded in FIGS. 6, 7, 8 and 9, respectively.

The flow diagram portion C depicted in FIG. 6 is a more detailed description of the instruction block 80 shown in FIG. 5. In such form, the portion C is comprised of instruction blocks 94, 96, 98 and 100. Instruction block 94 determines if the difference between the stored values R and D is not equal to the stored difference $\Delta C$; instruction block 96 determines if the stored value R is greater than the value R-MAX; the instruction block 98 determines if the stored value D is less then the value D-MIN; and the instruction block 100 determines if the difference between the stored values R and D is less than or equal to 100 digital counts. If one or more of the instruction blocks 94—100 are answered in the affirmative, the values R and D have not been reliably stored and further execution of the flow diagram is directed to the flow diagram line 83. If all three of the instruction blocks 96–100 are answered in the negative, the stored values R and D are reasonable and further execution of the program is directed to the flow diagram line 81.

Figure 7:
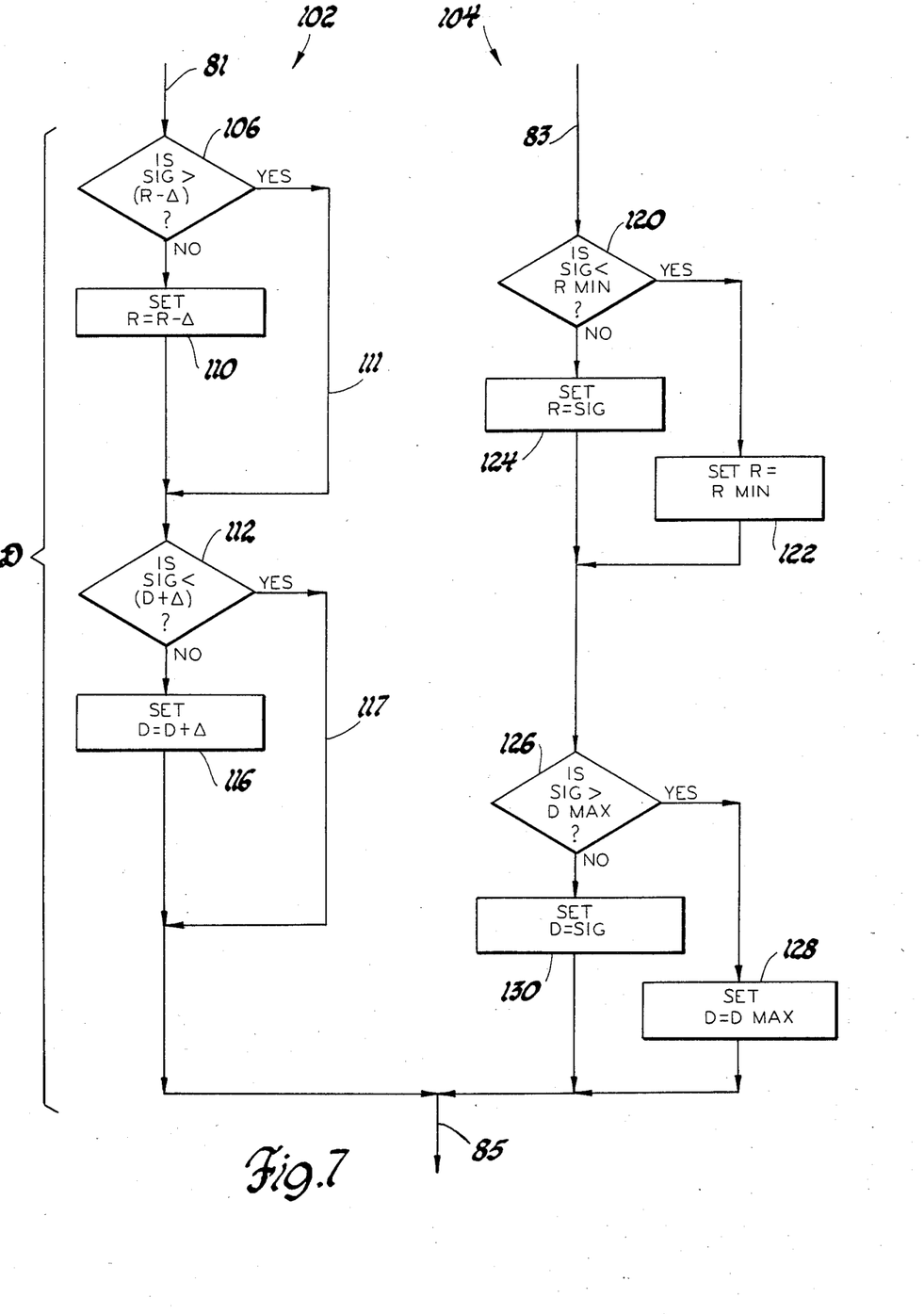

The flow diagram portion D is shown in more detail in FIG. 7. The instruction block 82 of FIG. 5 is represented by the lefthand portion 102 of the FIG. 7 flow diagram and the instruction block 84 of FIG. 5 is represented by the righthand portion 104 of the FIG. 7 flow diagram. Thus, the lefthand portion 102 is executed if the previously stored upper and lower reference values were found to be reasonable and the righthand portion 104 is executed if the previously stored upper and lower reference values were found to be unreasonable.

Referring firstly to the flow diagram portion 102, instruction block 106 is executed to determine if the sensor position signal (SIG) is greater than the quantity $(R-\Delta)$. If not, instruction block 110 is executed to set the stored upper reference value R equal to the quantity $(R-\Delta)$. As explained above, the range of values defined by the stored upper and lower reference values is thereby contracted to enable the compensation for errors which tend to contract the range of sensor output signal values. However, if the sensor output signal (SIG) is greater than the value $(R-\Delta)$ no such error exists, at least respecting the release position of accelerator pedal 26, and the execution of instruction block 110 is skipped, as indicated by flow diagram line 111. Instruction block 112 is then executed to determine if the sensor output signal value (SIG) is less than the quantity $(D+\Delta)$. If not, instruction block 116 is executed to set the lower reference value D equal to the quantity $(D+\Delta)$. As explained above, the range of values defined by the upper and lower reference values is thereby contracted to enable compensation for errors which tend to contract the range of sensor output signal values. However, if the sensor output signal (SIG) is less than the quantity $(D+\Delta)$, no such error exists, at least respecting the depressed position of accelerator pedal 26, and the execution of instruction block 116 is skipped, as indicated by flow diagram line 117. Thereafter, flow diagram line 85 directs the execution of flow diagram portion E as shown in FIG. 5.

As indicated above, the flow diagram portion 104 is executed if either or both of the upper and lower reference values R and D are found to be unreasonable at the initiation of vehicle operation. In such case, instruction block 120 is first executed to determine if the sensor output signal (SIG) is less than R-MIN. If so, it is assumed that the accelerator pedal 26 is not fully released and the upper reference limit R is set equal to R-MIN as indicated at instruction block 122. If instruction block 120 is answered in the negative, the upper reference value R is set equal to the sensor output signal value (SIG) as indicated at instruction block 124. Then, instruction block 126 is executed to determine if the sensor output signal (SIG) is greater than D-MAX. If so, it is assumed that the accelerator pedal 26 is less than fully depressed and the lower reference value D is set equal to D-MAX as indicated at instruction block 128. If instruction block 126 is answered in the negative, the lower reference value D is set equal to the sensor output signal (SIG) as indicated at instruction block 130. Flow diagram line 85 then directs the execution of flow diagram portion E as defined in FIG. 5.

As described above, the flow diagram portion E determines if the sensor output signal (SIG) is greater than R-MAX or less than D-MIN. If so, it is out of range and instruction block 88 is executed to set a failure mode of operation wherein the sensor output signal variable (SIG) is set equal to some predetermined and fixed value which will produce workable but somewhat degraded transmission performance. If the sensor output signal (SIG) is greater than or equal to D-MIN and less than or equal to R-MAX, it represents a possible position of accelerator pedal 26 and flow diagram line 89 directs the microprocessor-based control unit 40 to execute the flow diagram portion F.

Figure 8:
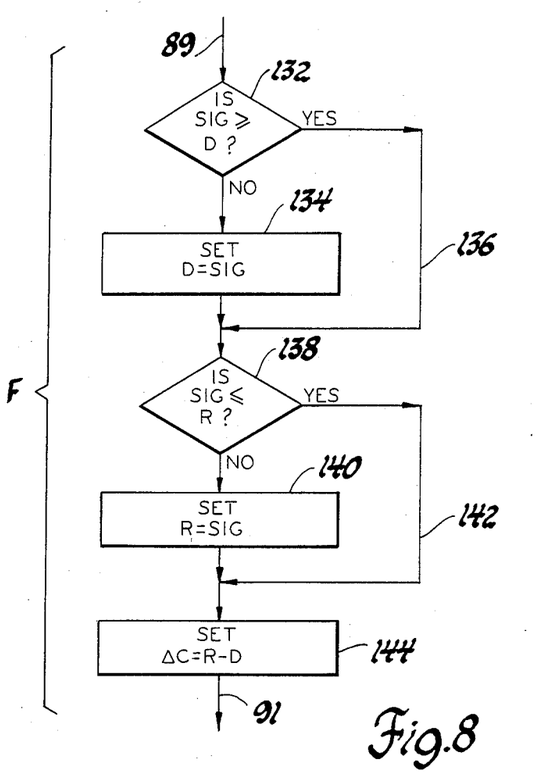

FIG. 8 shows the flow diagram portion F of FIG. 5 in more detail. Instruction block 132 is first executed to determine if the sensor output signal (SIG) is greater than or equal to the lower reference value D. If not, instruction block 134 is executed to replace the lower reference value D with the lower sensor output signal (SIG). If so, the execution of instruction block 134 is skipped, as indicated by flow diagram line 136. Instruction block 138 is then executed to determine if the sensor output signal (SIG) is less than or equal to the upper reference value R. If not, the upper reference value is replaced with the higher sensor output signal (SIG), as indicated at instruction block 140. If so, execution of instruction block 140 is skipped as indicated by flow diagram line 142. Instruction block 144 is then executed to determine the difference in digital counts ($\Delta C$) between the upper and lower reference values R and D. Flow diagram line 91 then directs the execution of flow diagram portion G as defined in FIG. 5.

Figure 9:
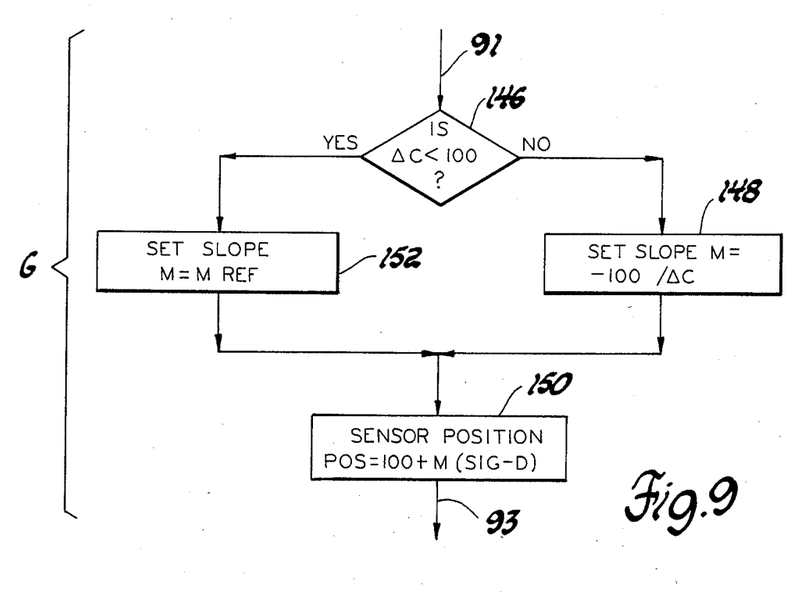

FIG. 9 provides a more detailed view of the flow diagram portion G depicted in FIG. 5. Instruction block 146 is first executed to determine if the difference in counts $\Delta C$ is less than 100 digital counts. If not, the difference between the upper and lower reference values R and D is sufficiently great to provide the desired position indication accuracy and instruction block 148 is executed to determine the slope M of the trace defined by the upper and lower reference values R and D on a graph of the type depicted in FIGS. 2–4. Such slope is negative in sign and has a magnitude equal to the quantity ($100/\Delta C$). The sensor position (POS) is then calculated as a function of the slope M according to the expression given in instruction block 150. If it is determined at instruction block 146 that the difference in counts $\Delta C$ is less than 100, the required accuracy cannot be obtained and instruction block 152 is executed to set the slope M equal to a reference slope M-REF. The instruction block 150 is then executed as described above for determining the sensor position indication (POS). The reference slope M-REF is the slope that would be calculated for a difference $\Delta C$ of 100 counts.

The operation of the control system of this invention for a typical period of vehicle operation will now be described. When the vehicle is not in operation, continuously powered memory in electronic controller 40 stores an upper reference value R and a lower reference value D, such reference values having been determined in previous periods of operation. The upper reference value R is the digital equivalent of the accelerator pedal sensor output signal (SIG) for the fully released pedal position, and the lower reference value D is the digital equivalent of the accelerator pedal sensor output signal (SIG) for the fully depressed pedal position. When the vehicle electrical system is enabled, the controller 40 begins executing the flow diagram shown in FIG. 5. Following an initialization routine (not shown), which resets the various flags and memory locations in controller 40, the digital sensor output signal (SIG) on line 38 is read. Since the initialization routine sets the INIT flag to zero, the instruction blocks 78–84 are executed at the initiation of vehicle operation. Instruction block 78 sets the INIT flag so that instruction blocks 78–84 are only executed at the initiation of a period of vehicle operation. The function of instruction blocks 80–84 is to determine if the previously stored upper and lower reference values R and D are reasonable (as defined by the instruction blocks 96–100 in FIG. 6), and to initialize them for the ensuing period of vehicle operation. If the reasonableness criteria are met, the initialization procedure consists of altering the upper and lower reference values by a predetermined amount $\Delta$ in a manner to reduce or contract the range of sensor output signal values defined thereby. As explained above, the purpose of such alteration is to enable the control system of this invention to compensate for errors which tend to contract the range of sensor output signal value within the range defined by the previously stored upper and lower reference values. However, the alteration is not made if the magnitude of the sensor output signal (SIG) indicates that such errors do not exist. Thus, the upper reference value R is not altered if the sensor output signal is greater than the quantity $R-\Delta$ and the lower reference value D is not altered if the sensor output signal (SIG) is less than the quantity $D+\Delta$. After the stored upper and lower reference values R and D are initialized, the controller checks to see if the sensor output signal (SIG) is out of range. If not, flow diagram portion F is executed to recalibrate the upper and lower reference values R and D, if necessary. If the sensor output signal (SIG) is less than the stored lower reference value D, the lower reference value is set equal to the sensor output signal (SIG). Similarly, if the sensor output signal (SIG) is greater than the upper reference value R, the upper reference value is set equal to the sensor output signal (SIG). Following the recalibration of the upper and lower reference values, the controller 40 proceeds to execute flow diagram portion G to compute the accelerator pedal position indication as a function of the upper and lower reference values and the sensor output signal. During the ensuing period of vehicle operation, the flow diagram portions A, E, F and G are repeatedly executed to read new sensor output signal values, to ensure that such values are within the range of allowable values, to recalibrate the stored upper and lower reference values R and D if necessary, and to update the accelerator pedal position indication based on the most recently read sensor output signal. If during such period of vehicle operation, drift or other like source of error causes the sensor output signal value to fall outside the range of values defined by the upper and lower reference values R and D, the respective upper or lower reference value will be replaced with the higher or lower sensor output signal value. If an error occurs which causes the range of sensor output signal values to contract within the range defined by the upper and lower reference values R and D—i.e. full depression or release of accelerator pedal 26 produces a sensor output signal value between the upper and lower reference values R and D—the upper and lower reference values R and D cannot be recalibrated immediately since such sensor output signal is perceived as a part throttle indication. However, at the initiation of the subsequent period of vehicle operation, the upper and lower reference values are re-initialized as discussed above in reference to flow diagram portion D in a manner to contract the range of sensor output signal values defined thereby, and such error will be compensated for in the ensuing period of vehicle operation. Thus, errors which tend to cause the range of sensor output signal values to fall outside the range of values defined by the stored upper and lower reference values are compensated for as they occur in a period of vehicle operation. Errors which cause the range of sensor output signal values to contract within the range defined by the stored upper and lower reference values are compensated for over one or more periods of vehicle operation depending upon the magnitude of the error.

While this invention has been described in reference to the illustrated embodiment, it will be understood that various modifications thereto may occur to those skilled in the art and that systems incorporating such modifications, may fall within the scope of this invention as defined by the appended claims.

The embodiments of the invention in which an exclusive property or privilege is claimed are defined as follows:

1. In a mechanism for sensing the position of an engine demand device positionable between upper and lower limit positions where such mechanism includes a sensor for providing an output signal the magnitude of which varies in relation to the position of the demand device, and a control unit which provides an indication of the demand device position as a function of the sensor output signal relative to previously stored upper and lower reference values representative of sensor output signals nominally corresponding to the limit positions of the demand device, apparatus for compensating the demand device position indication for wear and other like sources of error which affect the magnitude of the sensor output signal, comprising:

first means effective during engine operation for comparing the sensor output signal value with the stored upper and lower reference values and for replacing the upper or lower reference values with the sensor output signal value if the sensor output signal value is respectively above or below the corresponding upper or lower reference values, thereby to compensate the demand device position indication for errors which tend to expand the range of sensor output signal values outside the range defined by the previously stored upper and lower reference values; and second means effective at the initiation of each period of engine operation for altering the previously stored upper and lower reference values by a predetermined amount and in a sense to contract the range of sensor output signal values defined thereby so as to enable the first means to additionally compensate the demand device position indication for errors which tend to contract the range of sensor output signal values within the range defined by the upper and lower reference values prior to the alteration.

2. In a mechansim for sensing the position of an engine demand device positionable between upper and lower limit positions where such mechanism includes a sensor for providing an output signal the magnitude of which varies in relation to the position of the demand device, and a control unit which provides an indication of the demand device position as a function of the sensor output signal relative to previously stored upper and lower reference values representative of sensor output signals nominally corresponding to the limit positions of the demand device, apparatus for compensating the demand device position indication for wear and other like sources of error which affect the magnitude of the sensor output signal, comprising:

first means effective during engine operation for comparing the sensor output signal value with the stored upper and lower reference values and for replacing the upper or lower reference values, with the sensor output signal value if the sensor output signal value is respectively above or below the corresponding upper or lower reference values, thereby to compensate the demand device position indication for errors which tend to expand the range of sensor output signal values outside the range defined by the previously stored upper and lower reference values; and second means effective if the sensor output signal value at the initiation of engine operation relative to the previously stored upper and lower reference values indicates the potential presence of significant error tending to contract the range of sensor output signal values within the range defined by the previously stored upper and lower reference values for altering the upper and lower reference values by a predetermined amount and in a direction to reduce the range of sensor output signal values defined thereby so as to enable the first means to additionally compensate the demand device position indication for such errors.

3. Apparatus as set forth in claim 2, wherein said second means comprises:

means for comparing the initial sensor output signal value at the initiation of engine operation to the previously stored upper and lower reference values; and means for decreasing the previously stored upper reference value by a predetermined amount if it is greater than the initial sensor output signal value by at least said predetermined amount, and for increasing the previously stored lower reference value by a predetermined amount if it is less than the initial sensor output signal value by at least said predetermined amount.

4. In a motor vehicle control system including a movable engine demand device positionable between upper and lower limit positions, a sensor for producing an output signal value in accordance with the position of such demand device and control elements for computing a position indication as a function of the magnitude of the sensor output signal relative to previously stored upper and lower reference values representative of sensor output signal values nominally corresponding to the limit positions of the demand device, a method of compensating the position indication for wear and other sources of error that affect the sensor output signal value, comprising the steps of:

altering the previously stored upper and lower reference values at the initiation of a period of vehicle operation by a predetermined amount and in a sense to contract the range of sensor output signal values defined thereby, and replacing the upper or lower reference values with the sensor output signal value during the period of vehicle operation if such output signal value is respectively above or below the corresponding upper or lower reference values.

5. A method as set forth in claim 4, including the steps of:

overriding alteration of the previously stored upper reference value at the initiation of the period of vehicle operation if such alteration would reduce the upper reference value below sensor output signal value; and overriding alteration of the previously stored lower reference value at the initiation of the period of vehicle operation if such alteration would increase the lower reference value above the sensor output signal value.

6. In a motor vehicle control system including a movable engine demand device positionable between upper and lower limit positions, a sensor for producing an output signal value in accordance with the position of such demand device, and control elements for storing upper and lower reference values representative of sensor output signal values nominally corresponding to the limit positions of said demand device and for computing a demand device position indication as a function of the sensor output signal value and the demand device position vs. sensor output signal value slope defined by the stored upper and lower reference values, a method of compensating the position indication for wear and other sources of error that affect the sensor output signal value, comprising the steps of:

altering the previously stored upper and lower reference values at the initiation of a period of vehicle operation by a predetermined amount and in a sense to contract the range of sensor output signal values defined thereby;

replacing the upper or lower reference values with the sensor output signal value during the period of vehicle operation if such output signal value is respectively above or below the corresponding upper or lower reference values; and replacing said demand device position vs. sensor output signal value slope defined by the stored upper and lower reference values with a reference slope for the purpose of computing the demand device position indication if the difference between the said upper and lower reference values is reduced to less than a minimum allowable difference required to attain a desired level of computational accuracy, such reference slope being based on a difference at least as large as said minimum allowable difference.

* * * * *